(12) United States Patent
Ma

(10) Patent No.: US 11,156,798 B2
(45) Date of Patent: Oct. 26, 2021

(54) LENS MODULE AND ELECTRONIC DEVICE

(71) Applicant: AAC Optics Solutions Pte. Ltd., Singapore (SG)

(72) Inventor: Jie Ma, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/706,736

(22) Filed: Dec. 7, 2019

(65) Prior Publication Data

US 2020/0209510 A1    Jul. 2, 2020

(30) Foreign Application Priority Data

Dec. 31, 2018 (CN) .......................... 201822278970.4

(51) Int. Cl.
*G02B 7/04* (2021.01)
*G03B 17/12* (2021.01)
*H04N 5/225* (2006.01)
*G02B 9/06* (2006.01)

(52) U.S. Cl.
CPC ............... *G02B 7/04* (2013.01); *G03B 17/12* (2013.01); *G02B 9/06* (2013.01); *H04N 5/2254* (2013.01)

(58) Field of Classification Search
CPC ................................... G03B 17/12; G02B 9/06
See application file for complete search history.

(56) References Cited

U.S. PATENT DOCUMENTS 8,320,059 B2 * 11/2012 Lin ........................ G02B 5/003
359/740

| 8,967,814 | B2 * | 3/2015 | Chang | G02B 13/0045 |
| | | | | 359/611 |
| 2006/0171046 | A1 * | 8/2006 | Recco | G02B 7/022 |
| | | | | 359/811 |
| 2016/0178874 | A1 * | 6/2016 | Kim | G02B 7/021 |
| | | | | 359/738 |
| 2016/0223776 | A1 * | 8/2016 | Choi | G02B 7/023 |
| 2020/0174217 | A1 * | 6/2020 | Wang | G02B 7/025 |

FOREIGN PATENT DOCUMENTS

| CN | 106291857 A1 | 1/2017 |
| CN | 108459389 A1 | 8/2018 |
| JP | 2013205808 A1 | 10/2013 |

OTHER PUBLICATIONS

1st Office Action dated Nov. 29, 2019 by JPO in related Japanese Patent Application No. 2019194732 (4 Pages).
PCT search report dated Jan. 23, 2020 by SIPO in related PCT Patent Application No. PCT/CN2019/113829 (5 Pages).

* cited by examiner

*Primary Examiner* — Clayton E. LaBalle
*Assistant Examiner* — Dennis Hancock
(74) *Attorney, Agent, or Firm* — W&G Law Group

(57) ABSTRACT

The present invention provides a lens module and an electronic device. The lens module includes a lens barrel, a lens group and a supporting portion. The lens barrel is provided with a cavity inside. The lens group includes a first lens and a second lens arranged along an extension direction of an optical axis, one side of the first lens adjacent to the second lens is provided with a first clamping portion, one side of the second lens adjacent to the first lens is provided with a second clamping portion, the first clamping portion is clamped with the second clamping portion.

8 Claims, 3 Drawing Sheets

LENS MODULE AND ELECTRONIC DEVICE

TECHNICAL FIELD

The present disclosure relates to the field of optical imaging technologies, and more particularly, to a lens module and an electronic device.

BACKGROUND

With the continuous development of science and technology, portable electronic devices are continuously developing towards intellectualization and miniaturization. In addition to digital cameras, portable electronic devices such as tablet computers and mobile phones are also equipped with lens modules with shooting functions. The lens module generally includes a lens barrel and a lens group accommodated in the lens barrel, wherein the lens group includes a plurality of lenses, and the plurality of lenses are stacked together. However, when a distance between neighboring lenses is large, in order to assemble the neighboring lenses together, an edge thickness of the lens needs to be increased, while a thickness of a middle portion of the lens is relatively thin, so that it is difficult to mold the lens.

Therefore, it is necessary to provide a lens module and an electronic device including the same.

DETAILED DESCRIPTION

The present disclosure is further explained hereinafter with reference to the drawings and embodiments.

Figure 1:
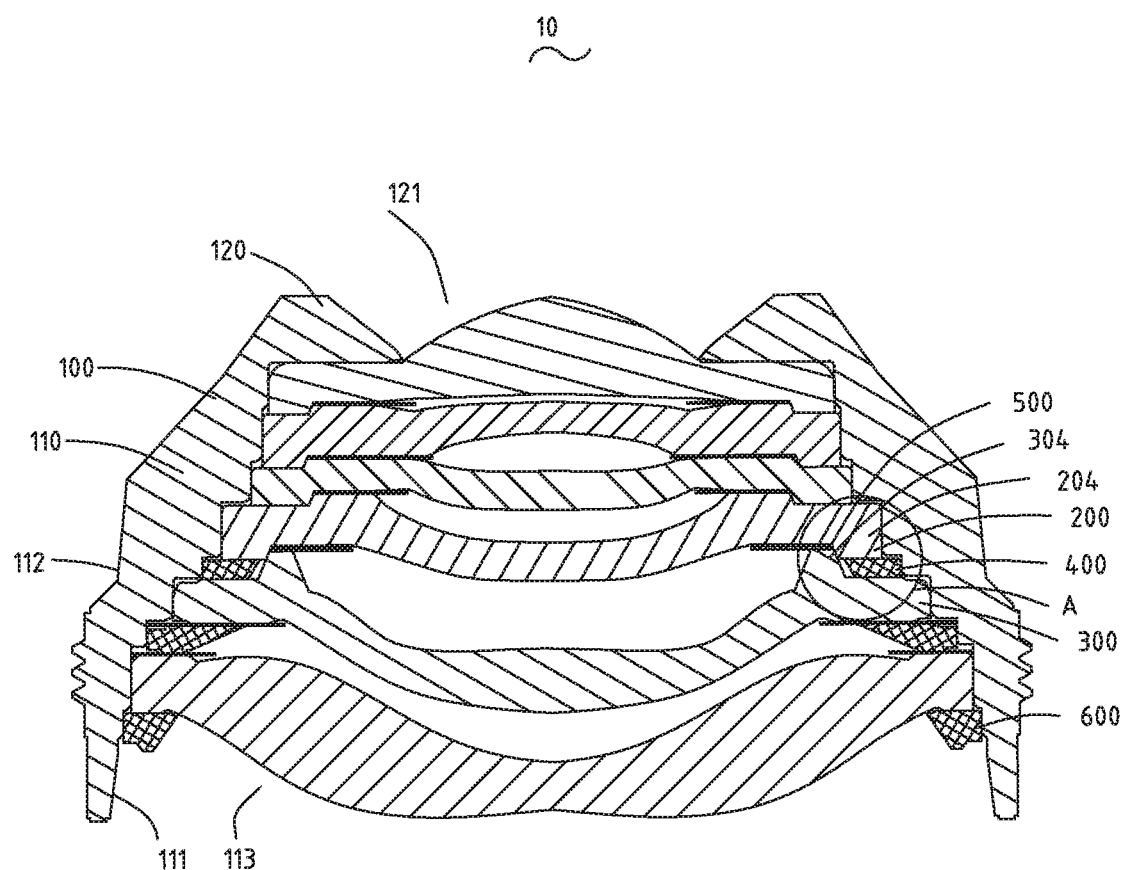
FIG. 1 is a sectional view of a lens module according to an embodiment of the present disclosure.

As shown in FIG. 1, a lens module 10 of the present disclosure is applied to an electronic device, wherein the lens module 10 includes a lens barrel 100, a lens group and a supporting portion 400. The lens barrel 100 includes an inner wall 111 and an outer wall 112 arranged opposite to the inner wall 111, and the inner wall 111 defines a cavity 113. The lens group includes a first lens 200 and a second lens 300 accommodated in the cavity 113 in sequence from an object side to an image side.

It is understood that, for the lens module 10, the object side refers to one side on which a photographed object is located, and the image side refers to an imaging side. Light enters the cavity 113 from the object side, passes through the lens group, and then exits from the cavity 113 to form an image on the image side.

Specifically, the lens barrel 100 includes a barrel wall 110 and a top wall 120. The barrel wall 110 defines the cavity 113. The top wall 120 is provided with a light-incident hole 121 communicated with the cavity 113, and the top wall 120 abuts against the lens group to restrict the lens group from moving along a direction from the image side to the object side. In addition, the lens module 10 further includes a pressure ring 600, which is connected with the barrel wall 110 and abuts against the lens group to restrict the lens group from moving along the direction from the object side to the image side.

Figure 2:
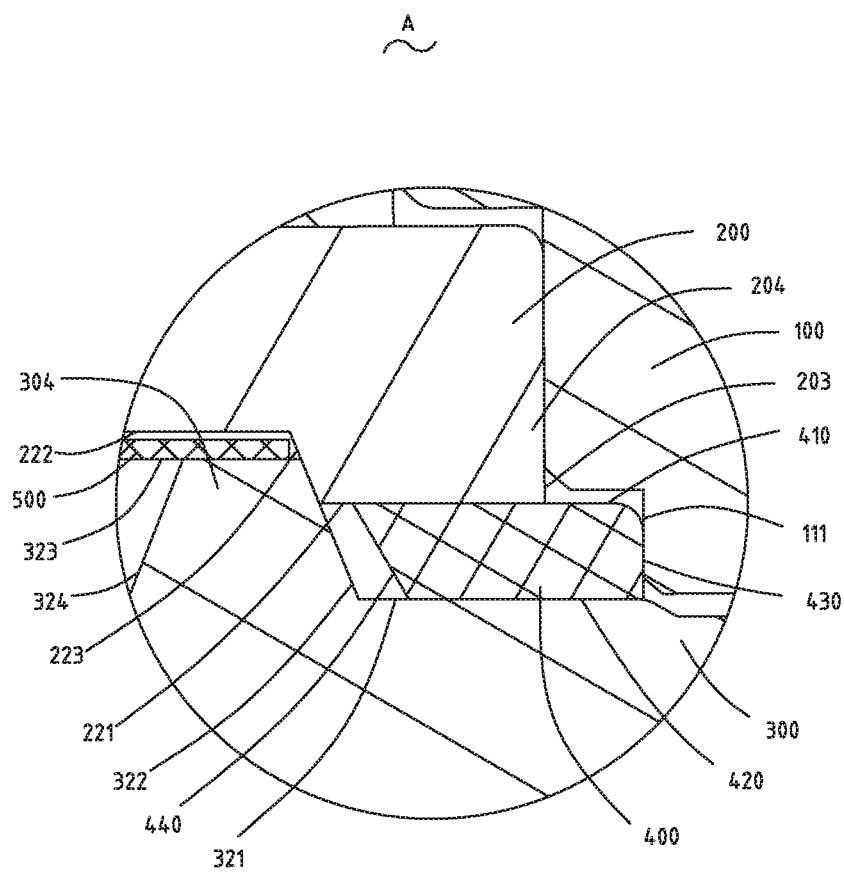
FIG. 2 is a partial enlarged drawing of a portion A in FIG. 1.
Figure 3:
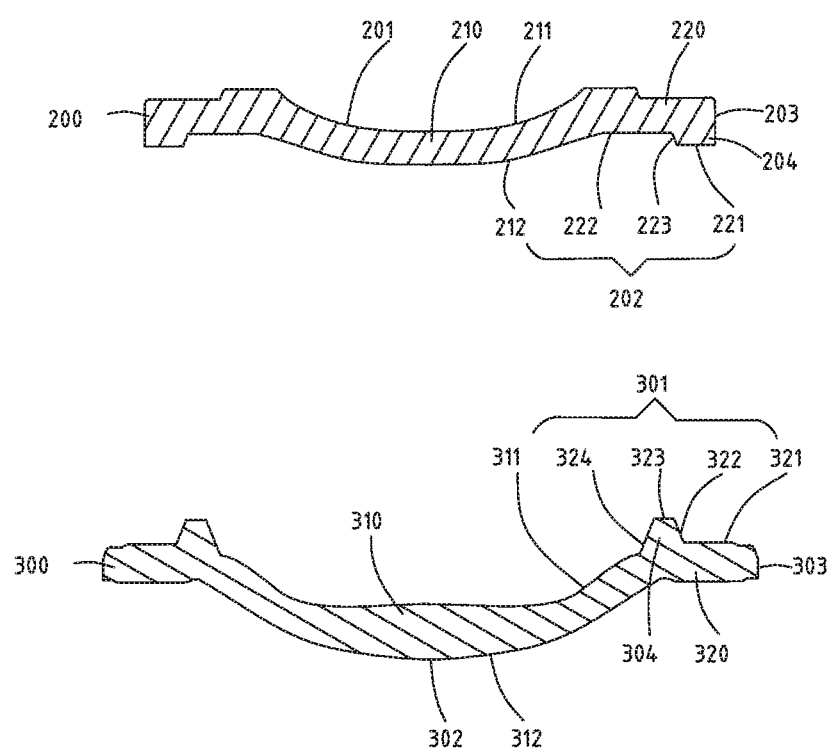
FIG. 3 is a sectional view of a first lens and a second lens in FIG. 1.

In the embodiment, referring to FIG. 2 and FIG. 3, the first lens 200 includes a first object side surface 201, a first image side surface 202, and a first side surface 203. The first object side surface 201 is arranged opposite to the first image side surface 202, the first side surface 203 connects the first object side surface 201 with the first image side surface 202, and the first image side surface 202 is provided with a first clamping portion 204 which is a protrusion extending along the direction from the object side to the image side. The second lens 300 includes a second object side surface 301, a second image side surface 302, and a second side surface 303. The second object side surface 301 is arranged opposite to the second image side surface 302, the second side surface 303 connect the second object side surface 301 with the second image side surface 302, and the second object side surface 301 is provided with a second clamping portion 304 clamped with the first clamping portion 204. The second clamping portion 304 is a protrusion extending along a direction from the image side to the object side, and the second clamping portion 304 is adjacent to an optical axis relative to the first clamping portion 204. The supporting portion 400 is arranged surrounding the second clamping portion 304, and the supporting portion 400 includes a first supporting surface 410 and a second supporting surface 420 arranged opposite to the first supporting surface 410. The first supporting surface 410 abuts against the first image side surface 202, and the second supporting surface 420 abuts against the second object side surface 301.

Specifically, the first image side surface 202 includes a first end surface 221, a first connecting surface 223 and a first bottom surface 222 sequentially connected along a inward radial direction of the first lens 200. The first end surface 221 is connected with the first side surface 203, the first end surface 221 and the first bottom surface 222 are arranged in a stepped manner along the direction from the image side to the object side, and the first end surface 221 and the first connecting surface 223 are arranged on the first clamping portion 204. The second object side surface 301 includes a second bottom surface 321, a second connecting surface 322, a second end surface 323 and a third connecting surface 324 sequentially connected along a inward radial direction of the second lens 300. The second bottom surface 321 is connected with the second side surface 303, the second end surface 323 and the second bottom surface 321 are arranged in a stepped manner along the direction from the object side to the image side, and the second connecting surface 322, the second end surface 323, and the third connecting surface 324 are arranged on the second clamping portion 304.

When the first lens 200 and the second lens 300 are assembled in the lens barrel 100, both the first side surface 203 and the second side surface 303 abut against the inner wall 111 to restrict the first lens 200 and the second lens 300 from moving along the radial direction of the lens. Meanwhile, the first bottom surface 222 abuts against the second end surface 323, the first connecting surface 223 abuts against the second connecting surface 322, the first end surface 221 abuts against the first supporting surface 410, and the second bottom surface 321 abuts against the second supporting surface 420 to determine a relative position of the first lens 200 and the second lens 300.

By arranging the supporting portion 400, the second lens 300 abuts against the first lens 200 through the supporting portion 400. That is, the first end surface 221 does not need to directly abut against the second bottom surface 321, but indirectly acts on the second bottom surface 321 through the supporting portion 400. In this way, an edge thickness of the first lens 200 or the second lens 300 can be reduced, which is beneficial for molding the first lens 200 and the second lens 300. Moreover, by arranging the supporting portion 400, assembly deformation will occur on the supporting portion 400, thereby avoiding the deformation of the first lens 200 and the second lens 300 from affecting the imaging quality. Moreover, the clamping of the first lens 200 and the second lens 300 makes it easier to align optical axes of the first lens 200 and the second lens 300, which can improve the assembly precision of the lens module 10, thus improving the imaging quality of the lens module 10.

It is worth mentioning that, due to that it is difficult to ensure the uniform thickness of all lenses during lens molding, when the thickness of the lens is relatively thin, a relatively thick supporting portion 400 can be selected to ensure a distance between neighboring lenses by arranging the supporting portion 400. On the contrary, when the thickness of the lens is relatively thick, a relatively thin supporting portion 400 can be selected. In this way, the problem of uneven edge thickness of the lens can be solved by configuring the supporting portion 400.

It should be noted that in other embodiments, the first clamping portion 204 can be adjacent to the optical axis relative to the second clamping portion 304. In this case, the supporting portion 400 is arranged surrounding the first clamping portion 204.

In addition, in this embodiment, the second clamping portion 304 is an annular protrusion, which can simplify the manufacturing process. Of course, in other embodiments, the second clamping portion 304 can be a plurality of arc-shaped protrusions arranged at intervals along a circumferential direction of the second lens 300.

Further, in this embodiment, an outer diameter of the second clamping portion 304 gradually decreases along the direction from the image side to the object side. That is, the second connecting surface 322 is arranged obliquely relative to the optical axis, and a distance between the second connecting surface 322 and the optical axis gradually decreases along the direction from the image side to the object side. Correspondingly, since the first connecting surface 223 abuts against the second connecting surface 322, the first connecting surface 223 is also arranged obliquely relative to the optical axis, and a distance between the first connecting surface 223 and the optical axis gradually increases along the direction from the object side to the image side, the clamping between the first clamping portion 204 and the second clamping portion 304 is facilitated, thus facilitating easy assembly.

Moreover, in this embodiment, an inner diameter of the second clamping portion 304 gradually increases along the direction from the image side to the object side. That is, the third connecting surface 324 is arranged obliquely relative to the optical axis, and a distance between the third connecting surface 324 and the optical axis gradually increases along the direction from the image side to the object side, so that a thickness of the second lens 300 gradually increases along the outward radial direction of the second lens 300 at the position where the third connecting surface 324 locates, thereby beneficial for molding the second lens 300. Meanwhile, stress concentration in the second clamping portion 304 can also be avoided, so as to enhance a mechanical property of the second lens 300.

In this embodiment, mainly referring to FIG. 2, the supporting portion 400 has an annular structure. Specifically, the supporting portion 400 further includes an external side surface 430 and internal side surface 440 arranged opposite to the external side surface 430. Both the external side surface 430 and the internal side surface 440 are connected with the first supporting surface 410 and the second supporting surface 420, and the external side surface 430 abuts against the inner wall 111. In this way, the relative position of the supporting portion 400 and the lens barrel 100 can be accurately determined during assembling, so that the supporting portion 400 is coaxially arranged with the first lens 200 and the second lens 300, so that the first lens 200 and the second lens 300 are evenly stressed, and deformation of the first lens 200 and the second lens 300 due to uneven stress is prevented, thereby affecting the imaging quality of the lens module 10.

Further, in this embodiment, the internal side surface 440 is spaced apart from the second connecting surface 322. That is, an inner diameter of the supporting portion 400 is greater than the outer diameter of the second clamping portion 304, thereby facilitating assembling the supporting portion 400 with the second lens 300. Moreover, when the supporting portion 400 is deformed under force, the supporting portion 400 can expand towards a space between the internal side surface 440 and the second connecting surface 322, thereby preventing the first lens 200 and the second lens 300 from moving along a direction parallel to the optical axis due to deformation of the supporting portion 400, thereby affecting the imaging quality of the lens module 10.

Moreover, in this embodiment, the inner diameter of the supporting portion 400 gradually increases along the direction from the object side to the image side. That is, the inner side surface 440 is arranged obliquely relative to the optical axis, and a distance between the inner side surface 440 and the optical axis gradually increases along the direction from the object side to the image side, so that the supporting portion 400 sleeves on the second clamping portion 304.

Further, in the embodiment, the outer diameter of the supporting portion 400 is greater than an outer diameter of the first lens 200. In this way, compared with the solution in which the first lens 200 directly abuts against the second lens 300, both stressed areas of the supporting portion 400 with the first lens 200 and the second lens 300 are increased, thus greatly reducing the deformation of the first lens 200 and the second lens 300 due to the stress. In this way, the imaging quality of the lens module 10 can be improved.

It should be noted that in this embodiment, the supporting portion 400 has an annular structure. In other embodiments, the supporting portion 400 can also has an arc-shaped structure, and the plurality of arc-shaped supporting portions 400 are spaced apart from each other around the optical axis.

In this embodiment, mainly referring to FIG. 3, the first lens 200 includes a first optical portion 210 and a first connecting portion 220 arranged surrounding the first optical portion 210, and the first connecting portion 220 is provided with a first clamping portion 204. The second lens 300 includes a second optical portion 310 and a second connecting portion 320 arranged surrounding the second optical portion 310, and the second connecting portion 320 is provided with a second clamping portion 304.

It can be understood that the optical portion is a portion with optical function in the lens, and the optical portion can be arranged in a concave or convex shape according to specific requirements, so as to diverge or converge light. The connecting portion is arranged surrounding the optical portion, and mainly serves to place and support the optical portion.

Specifically, the first optical portion 210 includes a first light incident surface 211 and a first light output surface 212 arranged opposite to the first light incident surface 211. The first connecting portion 220 includes a first end surface 221, a first connecting surface 223 and a first bottom surface 222, and the first bottom surface 222 is connected with the first light output surface 212. The first end surface 221, the first connecting surface 223, the first bottom surface 222 and the first light output surface 212 cooperatively form a first image side surface 202. The second optical portion 301 includes a second light incident surface 311 and a second light output surface 312 arranged opposite to the second light incident surface 311. The second connecting portion 320 includes a second bottom surface 321, a second connecting surface 322, a second end surface 323 and a third connecting surface 324. The third connecting surface 324 is connected with the second light incident surface 311. The second bottom surface 321, the second connecting surface 322, the second end surface 323, the third connecting surface 324 and the second light incident surface 311 cooperatively form a second object side surface 301.

After entering the cavity 113, the light can pass through the first light incident surface 211, the first light output surface 212, the second light incident surface 311 and the second light output surface 312 in sequence, and finally exits from the cavity 113. By arranging the optical portion and the connecting portion, neighboring lenses are connected through the connecting portion, so that an acting force generated by the abutted parts of the neighboring lenses after the lenses are assembled can be prevented from affecting the optical portion, so that the optical portion is prevented from being deformed to affect the imaging quality.

It is worth mentioning that in this embodiment, the lens module 10 further includes a light shielding portion 500, which is arranged between the first bottom surface 222 and the second end surface 323 and can block stray light. Moreover, due to that it is difficult to ensure the uniform thickness of all lenses during lens molding, when the thickness of the lens is relatively thin, a relatively thick light shielding portion 500 can be selected to ensure a distance between optical portions of neighboring lenses by arranging the light shielding portion 500. On the contrary, when the thickness of the lens is relatively thick, a relatively thin light shielding portion 500 can be selected. In this way, the problem of uneven edge thickness of the lens can be solved by configuring the light shielding portion 500.

In addition, in this embodiment, an inner diameter of the light shielding portion 500 is less than or equal to the outer diameter of the second optical portion 310, thereby ensuring the effect of the light shielding portion 500 of blocking stray light on the second lens 300.

It should be noted that the above embodiment is illustrated by taking the lens module 10 merely including two lenses as an example. In other embodiments, the lens module 10 may also include more lenses, and two neighboring lenses can be connected in the above manner.

The description above is merely the embodiments of the present disclosure, and it should be pointed out that those of ordinary skills in the art may make improvements without departing from the concept of the present disclosure, and all these improvements shall belong to the scope of protection of the present disclosure.

What is claimed is:

1. A lens module, comprising:
    a lens barrel, provided with a cavity inside;
    a lens group, comprising a first lens and a second lens arranged along an extension direction of an optical axis, wherein one side of the first lens adjacent to the second lens is provided with a first clamping portion, one side of the second lens adjacent to the first lens is provided with a second clamping portion, the first clamping portion is clamped with the second clamping portion, and the first clamping portion is away from the optical axis relative to the second clamping portion; and
    a supporting portion, comprising a first supporting surface and an opposite second supporting surface, wherein the first supporting surface abuts against the first lens, the second supporting surface abuts against the second lens, and the supporting portion is arranged surrounding the second clamping portion;
        wherein the supporting portion further comprises an external side surface and an opposite internal side surface, both the external side surface and the internal side surface are connected with the first supporting surface and the second supporting surface, and the external side surface abuts against the lens barrel;
        wherein the internal side surface is spaced apart from the second clamping portion.

2. The lens module according to claim 1, wherein an outer diameter of the second clamping portion gradually decreases along a direction from the second lens to the first lens.

3. The lens module according to claim 1, wherein the supporting portion has an annular structure.

4. The lens module according to claim 1, wherein the first lens comprises a first optical portion and a first connecting portion arranged surrounding the first optical portion, the first connecting portion is provided with the first clamping portion, the second lens comprises a second optical portion and a second connecting portion arranged surrounding the second optical portion, and the second connecting portion is provided with the second clamping portion.

5. The lens module according to claim 1, wherein the lens module further comprises a light shielding portion, and the light shielding portion is arranged between the first lens and the second lens.

6. The lens module according to claim 1, wherein the first lens and the second lens are accommodated in the cavity in sequence from an object side to an image side.

7. The lens module according to claim 6, wherein an outer diameter of the supporting portion is greater than an outer diameter of the first lens.

8. An electronic device, comprising the lens module according to claim 1.

* * * * *